United States Patent [19]

Tazi et al.

[11] Patent Number: 4,992,517
[45] Date of Patent: Feb. 12, 1991

[54] PROCESS FOR PRODUCTION OF COPOLYMERS OF MALEIC ANHYDRIDE AND AN ALKYL VINYL ETHER IN A STERICALLY HINDERED MONOETHER SOLVENT

[75] Inventors: Mohammed Tazi, Wayne, N.J.; Harold J. Harwood, Stow, Ohio

[73] Assignee: GAF Chemicals Corporation, Wayne, N.J.

[21] Appl. No.: 340,182

[22] Filed: Apr. 19, 1989

[51] Int. Cl.$^5$ ................................................ C08F 2/12
[52] U.S. Cl. ...................................... 526/209; 526/271
[58] Field of Search ................................ 526/271, 209

[56] References Cited

U.S. PATENT DOCUMENTS

| | | |
|---|---|---|
| 3,532,771 | 10/1970 | Field et al. ........................ 526/271 |
| 4,200,720 | 4/1980 | Evani et al. ........................ 526/209 |
| 4,451,630 | 5/1984 | Atkinsoon et al. . |
| 4,492,776 | 1/1985 | Atkinson et al. . |
| 4,522,990 | 6/1985 | Andrews ............................ 526/180 |

FOREIGN PATENT DOCUMENTS 60-63214  4/1985  Japan .

*Primary Examiner*—Joseph L. Schofer
*Assistant Examiner*—Alex H. Walker
*Attorney, Agent, or Firm*—Walter Katz; Marilyn J. Maue; Joshua J. Ward

[57] ABSTRACT

What is described herein is a process for making copolymers of maleic anhydride and a $C_1$–$C_8$ alkyl vinyl ether. In this process, a reactor is precharged with a solution of maleic anhydride in a sterically hindered monoether solvent and the alkyl vinyl ether monomer is fed thereto. Copolymerization is effected in the presence of a free radical initiator. A pumpable slurry of the copolymer in the reaction medium is formed upon polymerization, from which a copolymer product which is substantially a benzene-free powder is obtained.

3 Claims, No Drawings

PROCESS FOR PRODUCTION OF COPOLYMERS OF MALEIC ANHYDRIDE AND AN ALKYL VINYL ETHER IN A STERICALLY HINDERED MONOETHER SOLVENT

BACKGROUND OF THE INVENTION

1. Field of the Invention

This invention relates to a process for producing a copolymer of maleic anhydride and a $C_1$–$C_8$ alkyl vinyl ether monomer, and, more particularly, to slurry polymerization of such monomers in a sterically hindered monoether solvent in the presence of a free radical initiator.

2. Description of the Prior Art

Copolymers of maleic anhydride and alkyl vinyl ethers are conveniently prepared by free radical precipitation polymerization of the monomer mixture in an aromatic hydrocarbon solvent, e.g., benzene, in the presence of a dispersion aid, such as a protective colloid. However, isolation of the copolymer as a powder requires an expensive process step, and it is difficult to remove the toxic aromatic hydrocarbon solvent from the copolymer.

Accordingly, it is an object of the present invention to provide an improved process for the production of copolymers of maleic anhydride and a $C_1$–$C_8$ alkyl vinyl ether in the presence of a free radical polymerization initiator.

Another object of the invention is to prepare such copolymers by free radical slurry polymerization of the monomer solvent, wherein the copolymer is formed as a slurry in the reaction medium, and from which copolymer powders which are substantially benzene-free and which have low specific viscosities can be obtained easily.

A feature of the present invention is the use of a sterically hindered monoether as the reaction solvent in the process of slurry polymerization of monomers of maleic anhydride and an alkyl vinyl ether.

Another feature herein is the provision of copolymer powders of maleic anhydride and an alkyl vinyl ether which have a specific viscosity of less than about 2.1, and contain less than about 0.1% residual solvent, and is benzene-free.

These and other objects and features of the invention will be made apparent from the following more particular description of the invention.

SUMMARY OF THE INVENTION

An improved process for making copolymers of maleic anhydride and a $C_1$–$C_8$ alkyl vinyl ether is described herein. The process comprises precharging a reactor with a solution of maleic anhydride in a sterically hindered monoether and feeding a $C_1$–$C_8$ alkyl vinyl ether thereto. Slurry polymerization is effected in the presence of a free radical initiator. The copolymer is formed as a pumpable slurry in the reaction medium. Powders of the copolymer can be obtained by discharging the slurry from the reactor and drying, or filtering and drying. The copolymer powder is characterized by being substantially solvent-free and having specific viscosities of less than about 2.1. The powder also is benzene-free which contrasts to other solvents used in slurry polymerization, such as benzene, toluene and xylene, which leave benzene solvent in the product.

DESCRIPTION OF THE PREFERRED EMBODIMENTS

In accordance with the present invention, the maleic anhydride monomer reactant is precharged into a reactor as a solution in a monoether solvent which is sterically hindered so that substantially no peroxides can form in the reaction medium. Preferably, this solvent is a saturated, acylic dialkyl monoether which is sterically hindered by the presence of a tertiary butyl group. The remaining group in the molecule can be any $C_1$–$C_8$ alkyl radical. The monoether solvent may be further characterized by being benzene-free, of low toxicity, and having a low boiling point.

Suitable monoether compounds include methyl t-butyl monoether.

Typically, the maleic anhydride solution comprises about 1 part by weight maleic anhydride to about 7 parts by weight of the solvent.

The alkyl vinyl ether monomer is fed into the precharged maleic anhydride monomer solution to provide substantially a 1:1 molar ratio of monomers in the reaction mixture. A small excess of the alkyl vinyl ether monomer e.g., about a 10% molar excess or less of the alkyl vinyl ether monomer, may be used.

The reaction mixture comprises about 20% by weight monomer solids, or lower, in the monoether solvent.

Suitable alkyl vinyl ethers which are employed for copoloymerization with maleic anhydride are $C_1$–$C_8$ alkyl vinyl ethers, preferably $C_1$–$C_8$ alkyl vinyl ethers, e.g., methyl vinyl ethers, ethyl vinyl ether, n-butyl vinyl ether and vinyl 2-ethylhexyl ether.

The copolymerization is effected in the presence of a conventional free radical initiator. Examples of suitable initiators include peroxy esters, e.g., t-butylperoxy pivalate; diacyl peroxides, e.g., dibenzoyl peroxides, peroxydicarbonates, e.g., bis (4-t-butylcyclohexyl) peroxy dicarbonate; alkyl per esters, dialkyl peroxides, and azonitriles, e.g., azo bis-isobutyronitrile.

The initiator is employed in an amount of about 0.1 to 5% by weight of the monomers, preferably about 0.2 to 2% by weight.

The sterically hindered monoether compound used herein is a solvent for both monomer reactants but only a swelling agent for the copolymer. Accordingly, the polymerization process of the invention produces the desired copolymer product as a slurry in the reaction product mixture which can be easily discharged from the reactor and pumped to a suitable dryer where the solvent and excess alkyl vinyl ether can be removed to provide the copolymer in powder form. Alternatively, the slurry can be discharged, filtered, and then dried to provide the copolymer powder.

The polymerization temperature can vary over a wide range but is generally from about 50° to 90° C., preferably from 60° to 70° C.

The copolymerization is preferably carried out under atmospheric pressure or at the pressure of the reactants, and under an inert atmosphere such as is provided by nitrogen gas.

The invention will be illustrated hereinafter by the following examples.

EXAMPLE 1

A reaction mixture at a 20% solids level is prepared by:

Precharging 73.5 g. of MA into 480 g. of methyl t-butyl ether;

Purging with nitrogen;

Heating the precharge to 60° C.;

Adding 0.55 g. of t-butylperoxy pivalate (0.75% by wt. based on MA); and

Feeding 62 ml. (47.9 g.) of MVE (10% molar excess) over 4 hrs. continuously.

The reaction mixture then is held for 1 hr. at the reaction temperature, cooled to room temperature, and the reaction product slurry is discharged from the reactor. Upon filtering and drying there is obtained a fine, white powder of the copolymer having a specific viscosity of 0.36 (as a 1% solution in 2-butanone).

EXAMPLE 2

The process of Example 1 was repeated at a reaction temperature of 65° C. The specific viscosity of the copolymer product obtained was 0.23.

EXAMPLE 3

The process of Example 1 was repeated using 1.25% by wt. of the initiator at a reaction temperature of 65° C. A copolymer having a specific viscosity of 0.13 was obtained.

EXAMPLE 4

The processes of Examples 1-3 are repeated using di-t-butyl monoether, and ethyl t-butyl monoether, with similar results.

While the invention has been described with reference to certain embodiments thereof, it will be understood that changes and modifications may be made which are within the skill of the art. Accordingly, it is intended to be bound by the appended claims only, in which:

What is claimed is:

1. A slurry polymerization process for making copolymers of maleic anhydride and a $C_1$–$C_8$ alkyl vinyl ether which comprises:
   (A) precharging a reactor with a solution of maleic anhydride in methyl t-butylmonoether solvent,
   (b) feeding a $C_1$–$C_8$ alkyl vinyl ether thereto, in a molar excess of about 10% or less with respect to maleic anhydride, to form a reaction mixture having about 20% by weight monomer solids, or less,
   (c) polymerizing the reaction mixture in the presence of a free radical initiator at about 50° –90° C. to form a pumpable slurry of the copolymer product,
   (d) pumping the product from the reactor, and
   (e) recovering the copolymer product as a fine, white powder having a specific viscosity of about 2.1 or less as a 1% solution in 2-butanone and a solvent level of less than 0.5%.

2. A process according to claim 1 wherein said alkyl vinyl ether is methyl vinyl ether.

3. A process according to claim 1 wherein said specific viscosity is about 0.13 to about 0.36.

* * * * *